United States Patent [19]
Abels

[11] Patent Number: 4,546,847
[45] Date of Patent: * Oct. 15, 1985

[54] HYDROSTATIC-TRANSMISSION CONTROL SYSTEM, ESPECIALLY FOR LIFT AND OTHER INDUSTRIAL VEHICLES

[75] Inventor: Theodor Abels, Aschaffenburg-Nilkheim, Fed. Rep. of Germany

[73] Assignee: Linde Aktiengesellschaft, Hollriegelskreuth, Fed. Rep. of Germany

[ * ] Notice: The portion of the term of this patent subsequent to Dec. 2, 1997 has been disclaimed.

[21] Appl. No.: 355,302

[22] Filed: Mar. 5, 1982

Related U.S. Application Data

[60] Division of Ser. No. 129,258, Mar. 11, 1980, abandoned, which is a continuation of Ser. No. 863,622, Dec. 23, 1977, Pat. No. 4,236,596, which is a continuation-in-part of Ser. No. 688,774, May 21, 1976, Pat. No. 4,108,265.

[30] Foreign Application Priority Data

May 22, 1975 [DE] Fed. Rep. of Germany ....... 2522719

[51] Int. Cl.⁴ ............................................. B60K 17/10
[52] U.S. Cl. ...................................... 180/307; 60/450; 60/492
[58] Field of Search ....................... 180/307, 308, 305; 60/433, 434, 447, 450, 490, 492

[56] References Cited

U.S. PATENT DOCUMENTS

| 2,886,944 | 5/1959 | Horwood | 180/308 |
|---|---|---|---|
| 3,054,263 | 9/1962 | Budzich et al. | 60/490 |
| 3,058,297 | 10/1962 | Tolley | 180/308 |
| 3,153,900 | 10/1964 | Pigeroulet et al. | 180/308 |
| 3,214,911 | 11/1965 | Kempson | 60/450 |
| 3,243,959 | 4/1966 | Fantom | 180/308 |
| 3,477,225 | 11/1969 | Cryder et al. | 60/450 |
| 3,561,212 | 2/1971 | Pinkerton et al. | 60/492 |
| 3,650,107 | 3/1972 | Court | 60/490 |
| 3,881,317 | 5/1975 | Swoager | 60/444 |
| 3,986,357 | 10/1976 | Hoffmann | 60/490 |
| 3,986,358 | 10/1976 | Hoffmann | 60/490 |
| 4,108,265 | 8/1978 | Abels | 180/308 |
| 4,236,596 | 12/1980 | Abels | 180/307 |

FOREIGN PATENT DOCUMENTS

| 1775583 | 1/1972 | Fed. Rep. of Germany . | |
| 2260915 | 6/1974 | Fed. Rep. of Germany | 60/494 |
| 1321286 | 2/1963 | France . | |
| 1524836 | 4/1968 | France . | |
| 914182 | 12/1962 | United Kingdom . | |
| 935185 | 8/1963 | United Kingdom | 180/308 |
| 1112980 | 5/1968 | United Kingdom . | |
| 1164868 | 9/1969 | United Kingdom . | |
| 1176715 | 1/1970 | United Kingdom . | |
| 1228768 | 4/1971 | United Kingdom . | |
| 1326471 | 8/1973 | United Kingdom . | |
| 1544453 | 4/1979 | United Kingdom . | |

*Primary Examiner*—David M. Mitchell
*Attorney, Agent, or Firm*—Karl F. Ross; Herbert Dubno

[57] ABSTRACT

A hydrostatic-transmission control system for fork-lift trucks and like industrial vehicles has at least one of variable-displacement hydrostatic motor driving wheels on opposite sides of the vehicle and supplied by a pump having a control element for varying its displacement under the control of an operator. The prime mover, e.g. a gasoline engine or electric motor, drives the pump. The control system comprises means whereby, for low and average output speeds of the transmission consisting of a combination of the pump and motors, the control of the transmission ratio is a function only of the operator-set position of the aforementioned element whereas, for the highest output speeds, the ratio is controlled by both the position of this element and by a further parameter, usually the output speed of the prime mover.

2 Claims, 7 Drawing Figures

HYDROSTATIC-TRANSMISSION CONTROL SYSTEM, ESPECIALLY FOR LIFT AND OTHER INDUSTRIAL VEHICLES

CROSS-REFERENCES TO RELATED APPLICATIONS

This application is a division of Ser. No. 129,258 filed March 11, 1980 (now abandoned) as a continuation of Ser. No. 863,622 filed Dec. 23, 1977 (U.S. Pat. No. 4,236,596) and which in turn is a continuation-in-part of Ser. No. 688,774 filed May 21, 1976, now U.S. Pat. No. 4,108,265, issued Aug. 22, 1978.

FIELD OF THE INVENTION

The present invention relates to a control system for hydrostatic transmissions and, more particularly, to the control of hydraulically powered vehicles such as fork-lift trucks and other industrial vehicles adapted to carry heavy loads or to travel at particularly low speeds for precise placement of loads. The invention also relates to a method of operating a system consisting of a hydrostatic transmission and engine more effectively.

BACKGROUND OF THE INVENTION

Hydraulic transmissions and particularly hydrostatic transmissions are in widespread use for a number of purposes and generally comprise pump means, consisting of one or more pumps, driven by a prime mover such as an internal-combustion engine or an electric motor, and motor means such as one or more motors hydraulically connected with the pump means and displacing an output shaft or a number of such shafts.

The transmission ratio of such transmissions can be established by providing the pump means with a control element which varies the displacement of the fluid per revolution. When the pump means is an axial-piston pump, this control element can be a tiltable plate or control disk which varies the stroke of the axial pistons of the cylinder barrel (see pages 113 ff. of FLUID POWER, U.S. Government Printing Office, Washington, D.C. 1966).

Frequently the hydraulic motors are also of the axial-piston type (op. cit. pages 199 ff.) and can have a variable out-put depending upon the position of the tiltable control element (usually the cylinder barrel) as well. In this case the variable displacement can be considered to be in terms of the fluid displacement per output revolution of the input shaft.

Such transmissions can be set such that the output shaft rotates at low speeds with very high torque, at high speeds with low torque or at any intermediate condition.

Transmissions of this type have received widespread application in industrial vehicles adapted to transport or control large loads. Typical of these applications is a fork-lift truck whose driving wheels may each be provided with a hydraulic motor forming part of a hydrostatic transmission of the type described. In these cases the hydraulic transmission has the advantage that it allows the vehicle to creep while carrying a relatively large load at a high position for precise stacking and to travel at high speeds when unloaded so as to move from place to place at a storage or other industrial facility.

In all cases the prior-art control arrangements had a selectively positionable control element for the hydrostatic transmission which would set the transmission ratio, i.e. the speed ratio between the input shaft of the pump means and the output shaft of the motor means as required by the vehicle operator, this element being coupled, for example, to a pedal or lever at the driver position.

In most instances this element positively and directly established a transmission ratio so that for a given input shaft speed the output shaft speed is always proportional to the setting of this element.

This has been found to be advantageous for many purposes and was believed heretofore to be the most advantageous arrangement for fork-lift trucks and the like. For example, with a fork-lift truck, when a heavy lead is lifted into a high position and must be set in place carefully, this arrangement permitted the vehicle speed to be meticulously controlled, even with nonlevel floors or traveling surfaces, so that the vehicle could creep into a position independently of resistance to displacement of the vehicle. In general, therefore, it is of considerable advantage to have direct control of the transmission ratio by the operator for hydrostatic transmissions at low output speeds, especially for fork-lift trucks. Of course, the transmission ratio can be altered sharply when higher output speeds are required and this was accomplished merely by resetting the operator-controlled element.

In another conventional transmission arrangement, the transmission ratio was made fully dependent upon the load at the output shaft, i.e. the required output torque. This had the advantage that with increasing loading of the output shaft, the output speed was reduced so that increased torque was available and the power remained substantially constant. This prevented overloading of the machine and prevented such loading of the system as would bring output shaft to standstill. Control systems of this type are commonly used for hydrodynamic transmission in road-travel automotive vehicles although they have also been used with hydrostatic transmissions by way of suitable controls.

Systems of the latter type, however, do not permit the sensitive control of the speed and positions of the vehicle obtainable with the direct transmission ratio control arrangement described above.

It should also be recognized that it is known, in the control of a hydrostatic transmission, to shift—by an operator-controlled member—the control element of a variable-displacement pump of this transmission from its zero or minimum displacement position into its maximum displacement position and only then to operate the control element of a variable-displacement motor of this transmission to control the transmission ratio thereof. In such systems, the actuating or operator-controlled member is the sole means effecting displacement of the control element of the motor.

Throughout this description, whenever reference is made to the "displacement" of a hydrostatic machine—either a pump or a motor—the fluid-medium throughput per revolution is intended. This corresponds to the "stroke-volume per revolution" or the product per revolution where n is the number of pistons or cylinders of the machine, L is the axial stroke per piston over each revolution and A is the cross-sectional area of each cylinder. Naturally, in the case of an axial piston machine of the variable-displacement type L can be varied between $L_{min}$ or a minimum value of L (usually zero in the case of a pump) and $L_{max}$ corresponding to the maximum value.

OBJECTS OF THE INVENTION

It is the principal object of the present invention to provide an improved hydraulic transmission control system whereby disadvantages of earlier arrangements can be avoided and sensitive transmission ratio control can be obtained when necessary.

Another object of the invention is to provide an improved control arrangement for hydrostatic transmissions, especially for industrial vehicles such as fork-lift trucks, enabling maximum utilization of the available power of the prime mover and transmission thereof.

Still another object of the invention is to provide a more efficient drive system for fork-lift trucks and like vehicles.

It is yet another object of the invention to provide a control arrangment for a hydrostatic transmission which improves the characteristics of the transmission and the drive arrangement.

Another object of the invention is to provide a control system for an engine-hydrostatic transmission combination which extends the principles set forth in the aforementioned copending and now patented application.

It is yet a further object to provide an improved method of operating an engine-hydrostatic transmission system to avoid problems which have confronted prior-art techniques.

SUMMARY OF THE INVENTION

These objects and others which will become apparent hereinafter are attained in accordance with the present invention in a control arrangement for a hydrostatic transmission having a control element displaceable by the operator and control means whereby at low or average output-shaft speeds a transmission ratio between the input and output shaft speeds is regulated exclusively as a function of the position of this element, and means whereby at output-shaft speeds greater than these, i.e. at the highest output-shaft speeds the transmission ratio is controlled by this element and, in addition, in response an output parameter of the prime mover or transmission, e.g. the speed thereof.

According to the invention, therefore, one can consider a system which comprises a prime mover, usually an engine and especially an internal combustion engine, a hydrostatic transmission having a variable-displacement pump driven by the engine, and a load driven by a variable-displacement motor of the hydrostatic transmission. The hydrostatic transmission has a transmission ratio continuously adjustable over a given adjustment range (e.g. from zero to maximum). In addition, one may conveniently make reference to a "setting function" which is a concept analogous to a transfer function. Just as a transfer function is the law dictating the response of a system to an input, the setting function of the transmission is the "law" or relation dictating the response, i.e. the transmission ratio, to the control input, i.e. the position of the operator-controlled or actuating member.

In the system of the present invention, unlike prior-art arrangements in which the setting function remains substantially the same over the entire adjustment range, the setting function is *not* the same over this entire range.

More particularly, in that portion of the total adjustment range corresponding to lower or intermediate output speeds of the transmission *only* the operator-controlled actuating member controls the transmission ratio, i.e. the latter responds to the position of the member (which can be set only by the operator although selectively) in accordance with one kind of setting function. In the remainder of the total adjustment range, however, which can correspond to higher output speeds, the transmission ratio responds *both* to the member and to a further operating parameter, e.g. the output speed, engine speed or a variable which is a function thereof. Hence, in this latter part of the range, the setting function differs from that over the first-mentioned part of the range.

With a transmission having a variable-displacement pump and (at least one) one variable-displacement motor, it has been found to be desirable to connect the displacement-control element of the pump with the selectively-actuatable operator-controlled ratio-setting member so that, upon shifting of this member from a position corresponding to standstill of the output shaft, only the displacement of the pump is varied until the pump reaches its greatest stroke-volume per revolution at an end position of this member.

To further increase the output speed beyond that of the latter condition, the motor displacement is varied but not (or not only) as a function of the position of the selectively actuatable operator-controlled member (e.g. a footpedal), but under the effect of an additional influence or parameter, preferably the speed of the internal combustion engine.

Thus, with vehicles, such as fork-lift trucks, which must be controlled with precision, it is desirable that at low vehicle speed the control system provide a speed which is always exactly proportional to the position of the pedal because the operator can then establish the vehicle speed precisely with the pdeal position and change the speed by correspondingly precise change in the pedal position. By contrast, many operators prefer, when operating at higher speed, a control similar to that of passenger vehicles whereby, when the pedal is rapidly depressed, the vehicle accelerates at the maximum possible rate to a speed corresponding to the selected pedal position. In this high-speed range, the actual speed of the vehicle can vary for a given pedal position when the travel resistance changes.

Thus, in its most general form, the inventive concept is to be found in a control which provides in one part of the adjustment range corresponding to relatively low speeds, ratio setting only by the selectivity of positioning the operator-controlled actuating member, whereas in an adjoining range corresponding to higher output speeds, the ratio setting depends only upon the further operating variable or parameter.

With respect to the preferred embodiment of the invention (having a transmission with a variable-displacement pump and at least one variable-displacement motor in which the control element of the pump is directly connected to and is set only by the ratio-setting lever and the motor is additionally set in response to the further operating parameter), some further comments regarding the state of the art are in order.

Usually a hydrostatic transmission with a servomotor is constructed such that, from standstill of the output shaft, first the pump is brought to its greatest stroke-volume per revolution while the motor remains in its state of greatest stroke-volume per revolution. Only when the pump has been set to its position of greatest stroke-volume per revolution, is the motor adjusted in the direction of smaller stroke-volume per revolution, thereby attaining still higher output-shaft speeds for the given (maximum) fluid-medium flow. This is, of course, also the case with the system of the invention. In the prior-art systems, however, the same control arrangement is always provided for varying the displacement of the pump and for varying the displacement of the motor and hence the same setting function applies over the entire ratio-adjustment range.

In the system of the invention, however, the variation of the displacement of the pump is effected by one setting function while the variation of the displacement of the motor is effected by a different setting function. The variation of the displacement of the motor takes place only at higher output-shaft speeds and the variation of the displacement of the pump takes place only at lower output-shaft speeds.

When the principles of the present invention are applied to automotive vehicles, especially industrial vehicles of the fork-lift truck type, the pump means is preferably a variable-displacement hydrostatic axial piston pump whose shaft is coupled to the prime mover and constitutes the input shaft of the transmission. A swash plate or piston-stroke control element is the means whereby the transmission ratio can be regulated at lower output speeds between this input shaft and a pair of output shafts, driven by respective axial-piston hydrostatic motors hydraulically connected to the pump and further connected to the driving wheels of the vehicle. The prime mover is an internal-combustion engine or an electric motor.

The present invention is also based upon the recognition that the characteristics of direct operator transmission ratio control are important only at low speeds of the vehicle, for example for displacing a load of a forklift truck. However, at higher speeds such precise control of vehicle speed and transmission ratio is of no interest and it is advantageous here to provide a more "automotive" or inertial control whereby the transmission setting is a function of the engine speed or output-shaft speed.

According to the present invention, therefore, the advantages of both transmission characteristics are combined in that in the low-speed range the transmission ratio is directly controlled by the operator whereas in the high speed range it is controlled by another operating parameter of the vehicle system, for example the output speed of the engine.

The advantage of each of these two distinct transmission characteristics is attained without loss of advantage of the other transmission characteristic whom either one is more desirable.

Conventional forklift trucks with internal combustion engines as prime movers and hydrostatic transmissions having their pump shaft connected to the crankshaft of the engine, have a pedal directly coupled to the ratio-changing element of the transmission and simultaneously entraining a speed-control element of the engine, i.e. the accelerator lever of the carburetor.

With older and smaller forklift trucks the pedal directly sets the transmission and can be depressed against a restoring force which amounts to the resistance of the control element to displacement, i.e. the reaction of the pistons against displacement of the control element. In mover and larger forklift trucks, the pump is set by a servomechanism so that the speed-changing rate is limited by the rate at which the auxiliary servomechanism medium can be displaced in the servosystem. In either case the rate at which the ratio can be changed is limited to an acceptable degree. Consequently, for a given operating condition, the maximum power utilization can be described by a propulsion-force hyperbela. This characteristic curve is such that, when the vehicle carries its nominal load for displacement along a planar horizontal surface optimum acceleration prevails but maximum possible acceleration corresponding to pressing the pedal to the floor, overloads the system and requires removal of the foot from the pedal until control is restored. The entrainment of the speed-adjusting member of the engine with the pedal is designed so that the crankshaft speed for any particular power is somewhat greater than that which is required by the transmission. For climbing or for displacing heavy trailers, an override control may be operated by hand for a still higher engine speed or the pedal must be further displaced to provide an acceleration.

The system of the present invention, as described above, should also be distinguished from the intrinsic characteristic of hydrodynamic converters and corresponding controls for hydrostatic transmissions conventionally used for automotive purposes and wherein the vehicle speed is automatically adjusted in accordance with the resistance thereto. When the vehicle is operated under a dragging load over long stretches with high speeds, these systems are highly advantageous since they compensate for changes in the contour between climbing, level and falling stretches of the road. These systems, however, are not at all suitable for use with forklift trucks which frequently must travel with a raised heavy load over poor surfaces with exact positioning of the load at a particular point at which the load may be set down or raised. Under these conditions the vehicle must travel at very low speeds and be precisely controlled. The aforementioned system in which speed is a function of travel resistance is totally ineffective under these conditions.

Thus, the arrangment of the present invention allows the vehicle to operate under the most advantageous speed conditions, i.e. high speeds at which precise control is not needed and low speed at which such control is desirable, as required. Where precise control is desirable there is direct control of the transmission ratio from the pedal, independent of the engine speed and hence a proportionality between the pedal position and the vehicle speed. The higher vehicle speeds are, for all practical purposes, an automatic control response to resistance to travel.

According to another feature of the invention, the further parameter which contributes to the control of the transmission ratio at higher speeds of the vehicle is the output speed of the driving prime mover, e.g. an internal-combustion engine so that, when the speed drops as a result of overloading, the transmission ratio is reduced to lessen the load on the engine.

I have found it to be advantageous, as noted previously, that not only the pump is a variable-displacement machine but each of the motors constitutes a variable-displacement machine as well and has a setting element, e.g. a tiltable control plate or cylinder barrel, whose position determines the number of revolutions of the output shaft per unit volume of the fluid throughput through the hydrostatic transmission.

Each of the hydrostatic motors of the transmission can be provided with a pressure-responsive servomechanism which has a piston defining in a cylinder a respective chamber which is connected by a conduit between a constant-output auxiliary pump driven by the engine and a throttle location. A constant-volume auxiliary pump is a pump which has a constant fluid output per revolution. The net output of the pump per unit time is thus a function of the engine speed so that the pressure ahead of the throttle likewise is a function of the engine speed. This throttle can be placed in effect automatically when the main pump, i.e. the pump of the transmission, has reached its greatest displacement-per-revolution setting.

According to still another feature of the invention, each of the servomechanisms operating the control element of the respective hydrostatic motor has its compartment connected between the transmission pump and a throttle having a variable flow cross section. The variable flow cross section of the throttle can be controlled by an element independently of the pump-control element, i.e. another lever or pedal, or an element operatively connected to the pump-control element, so that the throttle cross section starts to reduce and thereafter is continuously reduced when the transmission pump has been set into its position of greatest stroke volume per revolution. Thus further operation of the control element for this pump in the direction tending to increase the output speed of the transmission will not offset the variable element of the pump but will only set upon the throttle previously mentioned.

I have found it to be desirable, with a system of the latter type and any arrangement in which the servomechanism for the hydraulic motor is tapped from the main hydraulic medium network of the transmission, to provide from each part of the transmission pump respective branches containing check valves which run to a common junction, the check valves respectively permitting flow to respective ports from this junction.

A pressure relief valve is provided with its output side opening toward this junction and its input side turned to one port of a changeover valve which permits the higher pressure of the two main lines connecting the transmission pump with the transmission motors to be delivered to the pressure relief valve. This same port is advantageously connected to a fixed throttle which communicates via a pressure relief valve with the variable throttle mentioned above. Each of the servomechanisms may have another compartment upon the servomechanism piston in a direction opposite that of the pressure in the first-mentioned compartment and connected to a location between the fixed throttle and the first pressure relief valve. The effective piston cross section in the second compartment can be substantially less than the effective piston cross section of the first-mentioned compartments.

According to another feature of the invention, a controllable valve can be provided in the line connecting the pressure source to the first-mentioned compartments of the servomechanisms and operated by the control element for the transmission pump so that, upon resetting of this pump to a smaller stroke volume than its maximum, the first compartments of the servomechanisms are drained.

It has already been mentioned that a particularly desirable arrangement is obtained when the prime mover is an internal combustion engine and the speed control for this engine is operatively connected with the transmission ratio controller of the transmission. However, to an increasing extent prime movers of fork-lift trucks are electric motors and I have found that when the electric motor is a shunt wound motor the transmission ratio control can be coupled with a field controller so that in the highspeed setting the transmission ratio control comes into play to decrease the current through the field windings of the shunt wound motor.

As noted, it is especially advantageous with the present system to provide a hydrostatic transmission in which both the pump and the motors are of the variable-displacement type having respective control elements which regulate the strokes of the respective pistons. According to the invention such a transmission is operated so that, from standstill to a certain output speed of the motor shafts, only the control element of the pump is displaced from its neutral or zero-displacement position to its maximum stroke volume position until the pump has achieved its maximum fluid displacement per revolution. Only thereafter is the motor element shifted from its maximum fluid displacement position toward the smallest permissible displacement position.

This mode of operation of the transmission has proved to be especially effective for the precise control of low vehicle speeds and the operation of the vehicle at high speeds by another parameter, e.g. the accelerator position of an internal-combustion engine or a setting member of an electric drive motor.

The pump is preferably directly controlled, i.e. the control member operated by the driver of the vehicle is coupled directly to the displacement-regulating element of the pump to obtain the desired proportionality between the setting of the control member and the transmission ratio for low speeds. The control elements of the motors, however, need be connected only indirectly with the control element since they may be operated, preferably automatically by the other parameter of the machine.

In many cases it is desired to operate below the maximum possible acceleration or with less than maximum speed. In these conditions the hydraulic motor elements are operated only as desired. Thus, instead of a load-regulating or power control which automatically maintains a constant power, the secondary adjustment of the motor-control elements can be achieved in a simple manner.

It is possible to control the secondary speed adjustment via an orifice so that, after the full angular displacement of the pump-control element for a given load condition, for example travel of a forklift truck with raised lead along a planar surface, an approximately constant power is maintained. Thus, there are two possibilities for expleitation of a single throttle. Either the static pressure ahead of the throttle position can be used to control the setting of the hydraulic motors, or the flow of control fluid through the throttle constriction can be used directly to control the setting of the hydraulic motor. In the latter case the rate of adjustment of the motor-control elements is limited by the constriction.

Generally the hydraulic motor has only two basic positions, namely, a position of maximum displacement over which the motor is operated until the pump-control element has reached its maximum angular position away from the neutral, and the motor-control position corresponding to minimum stroke volume into which the motor is set once the pump has achieved its maximum stroke position. The movement of the motor from the first to the second position takes place slowly.

If the operator wishes to maintain a constant vehicle speed between the speed conditions at the two extremes of the motor settings, the control is effected by operating the primary element, i.e. the pump control.

This poses no particular difficulty although it should be noted that readjustment of the pump-control element after it has been brought into its extreme maximum-stroke position results in a shifting of the motor-control element from the secondary extreme position toward the first so that the control characteristic has a certain hysteresis.

The pump-control element may be operatively connected with a valve, for example by a lever, so that when the pump-control element is at least close to its maximum stroke volume and is adjusted, the valve leading to the servomotors of the hydraulic motors is shifted to drive the control elements of these motors to a reduced angular position. The control of the motor elements by the hydraulic medium stream through the aforementioned throttle ensures that acceleration is never extreme and that a reduced speed can be maintained by operation of the pump-control element. Of course, the valve can be closed even by the slightest displacement of the pump-control element if it is desired to switch out a response of the motor and vice versa.

With the combination of the present invention in which the primary side (pump) of the hydrostatic transmission is controlled, one can achieve true constant-power control or at least a markedly simpler regulation of the vehicle speed with optimum characteristics both for low-speed and high-speed travel. The system utilizes the available power of the apparatus more fully and allows higher operating speeds, especially with forklift trucks. The pedal forces for control of the transmission can be held relatively low and the pump and motor-control elements can be direct, e.g. via levers, or with the aid of servomechanisms whereby the proportionality between the position of the actuating member (e.g. the drive pedal) and the control element of the pump is maintained. The drive shaft of the pump may also be provided with an auxiliary pump which can supply the servomechanisms of the hydraulic motors, preferably via an adjustable throttle which can be controlled from the pressure in the transmission.

BRIEF DESCRIPTION OF THE DRAWING

The above and other objects, features and advantages of the present invention will become more readily apparent from the following description, reference being made to the accompanying drawing in which.

SPECIFIC DESCRIPTION

For ease of understanding, the invention will be specifically described as applied to a forklift industrial vehicle adapted to travel in warehouses, dockyards and other industrial enclosures with the fork in a raised or lowered position, with or without a load and powered by a prime mover which can be an internal-combustion engine or an electric motor.

Where the prime mover is an electric motor it may be operated by a battery carried by the vehicle itself and recharged during periods of nonuse of the vehicle. However, the system is applicable to other hydraulically driven vehicles and hence the specific description as applied to forklift vehicles should not be considered a limitation to them although they are the preferred mode of realizing the invention.

Furthermore, when reference is made to a hydraulic pump, the pump may be a hydrostatic axial-piston pump of the type described in "FLUID POWER", supra. Such pumps have a swash plate for controlling the stroke of the pistons upon angular displacement of the swash plate from a neutral position to angular extreme positions to either side of the neutral position and corresponding to forward and reverse travel of the vehicle. The pump is driven by the prime mover.

The hydraulic motors described herein can be axial-piston motors as illustrated and discussed in "FLUID POWER" (supra) with variable stroke obtained by swinging the cylinder barrel relative to the output shafts. The output shafts are coupled to the driving wheels of the vehicle and/or to tracks for propelling the same.

Finally, by way of introduction, it will be noted that servomechanisms are sketchily described herein to displace the control elements of the pump or motors. In this case the more complex hydraulic servomechanisms of "SERVOMECHANISM PRACTICE", McGraw-Hill Book Co., 1960, may be used, complete with pilot valves or pistons, follower pistons and the like.

Figure 1:
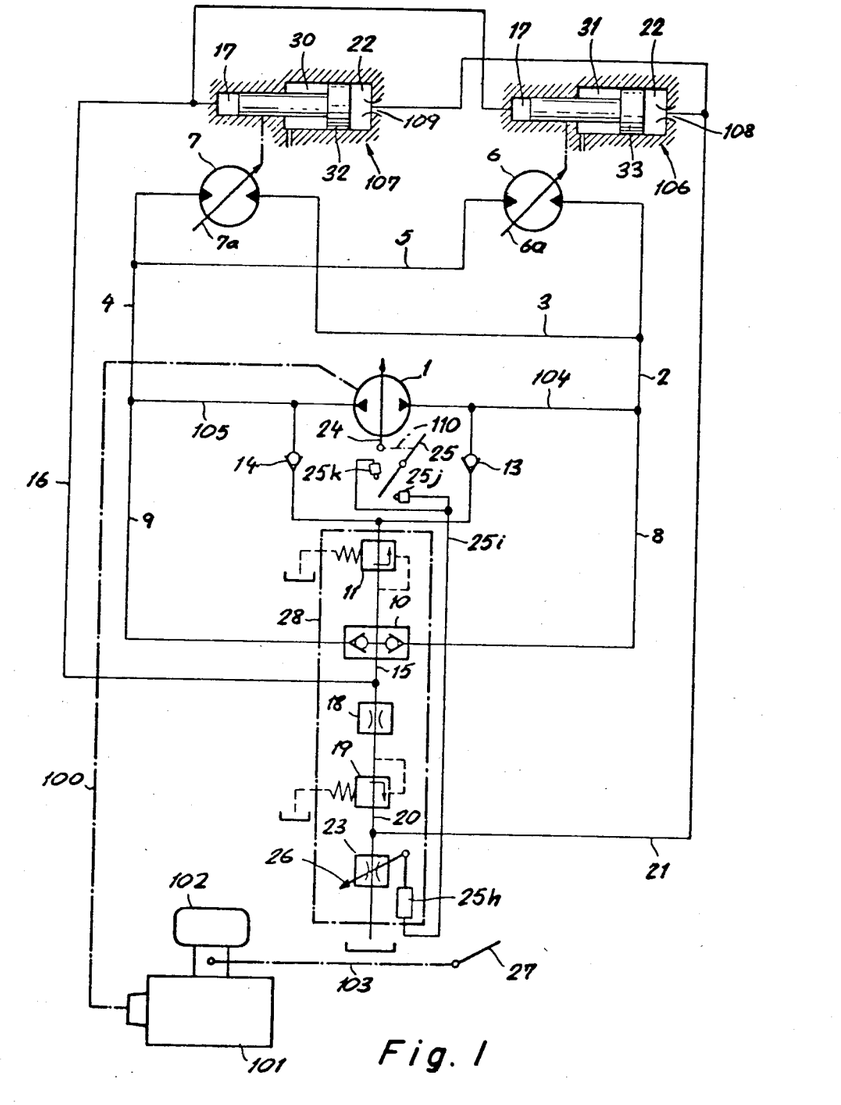
FIG. 1 is a hydraulic circuit diagram of a transmission according to the invention.
Figure 1A:
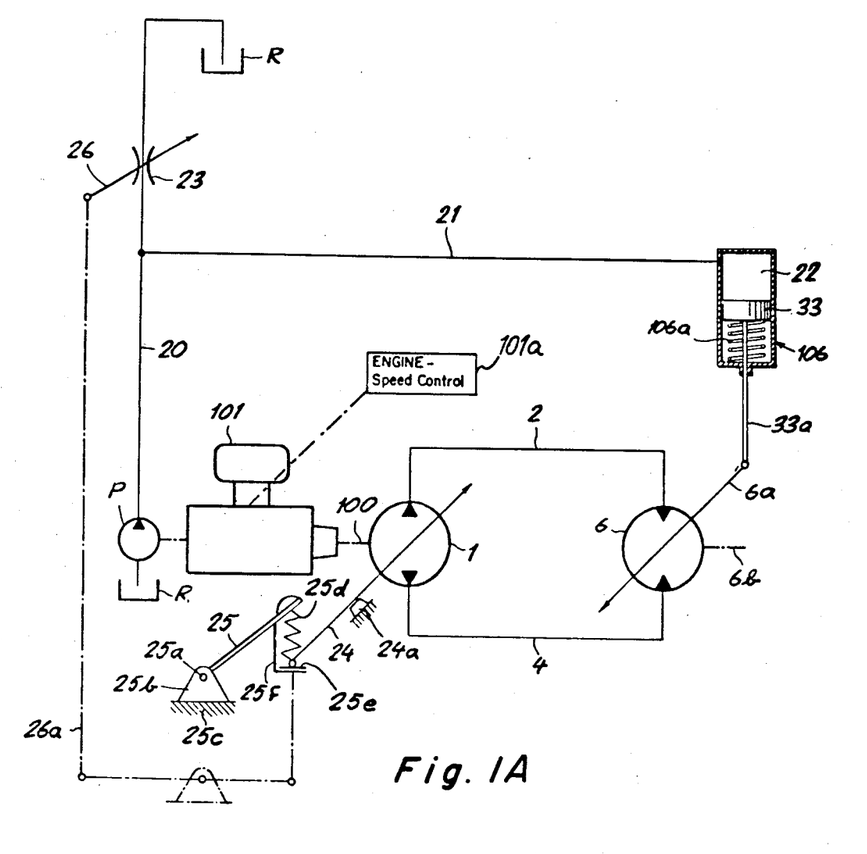
FIG. 1A is a simplified diagram illustrating the principles of the invention.

FIG. 1A shows a relatively simple hydraulic circuit embodying the invention. The axial-piston pump 1 has its input shaft 100 connected to the crankshaft of an internal combustion engine 101. The control element 24 of this pump, which is swingable to vary the displacement thereof, is connected to a pedal 25. More specifically the pedal 25 is pivoted at 25a on a support 25b to the vehicle chassis 25c and carries a compression spring 25d on one end of which is a plate 25e. The control element 24 is pivoted to this plate.

Hydraulic lines 2 and 4 connect the ports of the pump 1 to the ports of a variable-displacement axial piston motor 6 whose output shaft 6b is connected to a load (not shown), e.g. the driven wheels of the vehicle. The control element 6a of the motor 6 is articulated to the piston rod 33a of a piston 33 displaceable in a cylinder 106 against a compression spring 106a by fluid admitted under pressure to a chamber 22.

The chamber 22 is connected by a line 21 to a point along a line 20 between a throttle 23 and a constant-displacement pump P whose shaft is connected to the crankshaft of engine 101. The throttle 23 discharges into a reservoir R from which the pump P draws fluid.

Throttle 23 is of the adjustable-orifice type and has a control element 26 regulating its cross section. This control element 26 is connected by a linkage 26a to a bracket 25f guided in the chassis 25a.

Assuming that engine 101 is running but shaft 6b is at standstill, the pedal 25 is not depressed and the throttle 23 is fully open. In this position the pressure in chamber 22 does not overcome the force of spring 106a and the motor 6 is set for maximum displacement (stroke-volume per revolution). Pump 1 is set in its neutral position and fluid is not displaced to motor 6.

When the pedal 25 is depressed, the control element 24 is swung from its neutral position and fluid is fed to motor 6 to drive shaft 6b. The transmission ratio at these low speeds is controlled solely by the pedal 25.

When the element 24 strikes abutment 24a corresponding to maximum displacement of pump 1, any further depression of the pedal 25 causes downward displacement of bracket 25f and compression of spring 25d. Throttle 23 is closed correspondingly to build up a backpressure in line 20 which, applied by line 21 to chamber 22, overcomes the force of spring 106a to displace the piston 33 and the control element 6a in a direction tending toward lower displacement per revolution of motor 6.

Since pump P is a constant displacement pump, its output per revolution is constant but its delivering rate is proportional to the speed of engine 101. Increased engine speed is manifested as higher backpressure in line 20 and vice versa. Consequently the motor element 6a is displaced as a function of engine speed (determined by an engine-speed control 101a) in the higher speed ranges.

Referring now to FIG. 1 it will be apparent that the basic elements of a transmission, according to the invention comprise a pump 1 driven, as represented by the dot-dash line 100, by an internal-combustion engine 101 whose carburetor 102 has its butterfly or accelerator control tied via a linkage 103 to an accelerator pedal 27. The pump 1 is reversible as described and feeds hydraulic fluid via lines 104 and 105 to lines 2 and 3 connected to one side of each of a pair of hydromotors 6 and 7. The other side of the pump is connected to lines 4 and 5 communicating with the opposite sides of the hydromotors 6 and 7 which have variable displacement, being provided with control elements represented at 6a and 7a, respectively. Each of these motors 6, 7 operates the drive wheel on one side of the vehicle.

Figure 6:
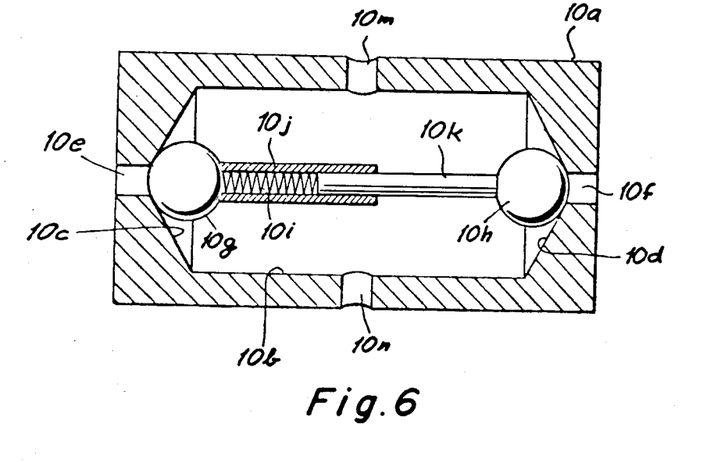
FIG. 6 is a diagrammatic cross-sectional view of a changeover valve of the type used in accordance with the present invention.

A line 8 is connected to line 2 and line 9 is connected to line 4, the lines 8 and 9 extending to opposite inlet ports of a changeover valve 10 best seen in FIG. 6.

The changeover valve as shown in FIG. 6 can comprise a housing 10a forming a cylindrical chamber 10b with frustoconical seats 10c and 10d at respective inlet ports 10e and 10f. The seats 10c and 10d are engageable by ball-shaped closure members 10g and 10h held apart by a spring 10i within a tubular stem 10j carried by ball 10g. A stem 10k carried by the other ball 10h is telescopingly received in the stem 10j. The housing 10a also has outlet ports 10m and 10n which are connected as will be described in greater detail below.

When the pressure at inlet port 10a prevails over the pressure at inlet port 10f, the ball 10g is thrust inward and the pressure of port 10e is delivered to outlet ports 10m and 10n. When the pressure at port 10f prevails over the pressure at port 10g, member 10h is displaced inwardly and this pressure is communicated to ports 10m and 10n.

Thus, the higher pressure prevailing in the lines 8 and 9 is applied to the outlets 10m and 10n of the changeover valve and to the inlet of a pressure-relief valve 11 which communicates with a line 12 tied by a pair of check valves 13 and 14 to the lines 104 adn 105. The check valves 13 and 14 prevent the pressure from the pump outlet, whichever side it happens to be at a particular moment, from being applied to line 12. Those check valves, however, allow fluid from line 12 to be returned to the intake side of the pump. Valve 11 thus effectively establishes a threshold pressure in line 15 to which the port 10n of the chamber 10 is connected.

Line 15 terminates in a fixed cross-section constriction 18 ahead of another pressure-relief valve 19 whose discharge side communicates with a variable cross-section throttle 23 whose control member 26 is linked to a cylinder 25h. The latter is connected by line 25i to cylinders 25j and 25k actuated by lever 25 when the pedal 25 is displaced in either direction beyond the maximum displacement position of pump 1.

A line 16 communicates between line 15, ahead of the throttle 18, and the small cross-section chambers 17 of a pair of servomotors 106, 107 whose pistons 33 and 32, respectively, are connected to control elements 6a and 7a of hydraulic motors 6 and 7.

The pistons 32 and 33 are stepped to have small-diameter ends in the compartments 17 and large-diameter ends in cylinder bores 30 and 31 of the servomotor to define compartments 22 therein with larger effective surface areas than those of compartments 17.

A line 21 communicates between line 20, ahead of the adjustable throttle 23, and the large-diameter compartments 22 via further throttles 108, 109 whose flow cross-sections regulate the rate at which fluid can be fed to the compartments 22.

The control element 24 of the pump 1 is coupled by a lost-motion linkage 110 directly with a pedal 25 constituting the control member which is, in turn, displaceable by the operator.

Another arrangement (FIG. 2) can provide a small hydraulic (oil) stream ultimately drawn from a feeding pump P' as seen in dot-dash lines to act against the spring force of the hydraulic motor. In this case, the pump-control member 125 can operate a valve 120c causing displacement of the pump element 124 until it has reached its maximum displacement. Thereafter the fluid causes the displacement of the servomotor 122 of the hydraulic motor 106 against its spring force.

When the control of the servomotors of the hydraulic motors is effected by the static pressure ahead of a throttle in a circuit containing an auxiliary pump with a constant displacement, this static pressure increases and thus raises the transmission ratio as soon as the speed of the engine and thus the auxiliary pump increases. Thus, when the accelerator of the internal-combustion engine is set to a higher value and the engine is operating at higher power, the transmission is automatically set to a higher speed of the output shafts of the motor. When the rotary speed of the engine is reduced, e.g. as a result of overloading the latter, the transmission is automatically set into a smaller ratio and hence relieves the loading of the internal-combustion engine. The setting of the transmission pump does not need to be changed during this operation.

Preferably, the transmission pump is actuated by a pedal 25 (FIG. 3) and/or a manually actuatable lever by the vehicle operator to establish the transmission ratio at the desired level. The further parameter whereby the independent control of the hydromotors is effected can be accomplished by means of a rod or linkage 47 etc. (FIG. 3) tying the actuating member for the pump-control element to the engine controller preferably with some play so that the first part of the movement of the engine controller displaces the pump-control element only and when this displacement reaches its limit, the hydromotors have their control elements displaced. The hydromotors can be operated by the pressure in the transmission and preferably or especially by the output speed of the engine. The control element of the hydromotors may be a valve which is switched into operation when the hydromotor control is desired.

The control element 125 of the pump 125 (FIG. 2) should be swingable in either direction out of its neutral position for driving the transmission in either direction and both forward and rearward travel may utilize the characteristic of the invention whereby a prime mover parameter may be used to control the hydromotors when the pump element is in its limiting operative position. However, this dual characteristic operation is preferred for at least the forward movement.

Figure 2:
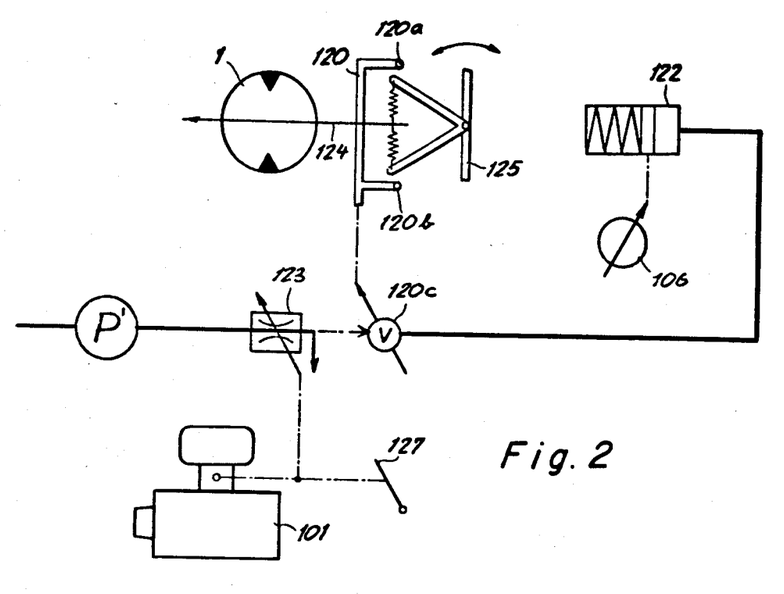
FIG. 2 is a diagram of a portion of a control system illustrating other principles of the invention.

The pump element may have a double-arm lever 120, each of whose arms is provided with an abutment, the abutments being effective when the element is in one or the other extreme position to actuate the hydromotor valve 120c always in the same sense. In this case it has been found to be advantageous to put the pilot valve or other input element of the hydromotor servomechanism close to the actuator of the pump and thereby avoid linkages, setting errors or the like. This arrangement also makes it possible to simply adjust the strokes of the various elements so that directly upon termination of movement of the pump-control element, the movement of the motor-control element will commence.

Referring again to FIG. 1 it will be seen that a displacement of the pump-control element 24 of pump 1, when the latter is driven by engine 101, will result, for example, in the supply of fluid under pressure to line 104 and to the right side of each of the hydromotors 6 and 7 to drive the vehicle, for example, in the forward direction. A low pressure prevails in line 105 and a high pressure in line 104. As the pedal 25 is displaced still further, the deviation of control element 24 from its neutral position increases, thereby increasing the pressure in line 104. This pressure is applied via line 8 to one input of the changeover valve 10 and through this valve is applied to line 15 whence it is delivered via conduit 16 to the compartments 17 tending to hold the actuating elements 6a and 7a in their maximum stroke positions.

If because of increased engine speeds or greater resistance to forward movement, the pressure builds up in line 2 still further, fluid is forced through throttle 18 and operates the threshold pressure relief valve 19.

If now that the element 24 is in its limiting position corresponding to maximum displacement per revolution, the lever 25 is shifted further, cylinder 25j will become effective to actuate the throttle 26 and produce a back pressure which is applied by line 21 to chamber 22, counteracting the pressure in chamber 17 and causing displacement of the motor-control element toward a lower displacement per revolution.

Since the pressure at line 21 is invariably less than that at line 15, but the effective cross-sectional areas of compartments 22 is substantially greater than that of compartment 17, the pistons 32 and 33 are subject to differential pressure displacement to the left.

When the control element 24 is swung in the opposite sense from its neutral position, a similar operation ensues except that line 105 is pressurized and the hydromotors 6 and 7 are rotated in the opposite sense. In either case, excessive pressure buildup cannot occur because any excess pressure is bled back through pressure-relief valve 11 to the intake side of the pump.

FIG. 2 shows an arrangement in which a pedal 125 is connected to the control element 124 of a pump 1 to operate the latter in either direction. In either extreme position of the pump-control element, a double-arm lever 120 is operated via its abutments 120a and 120b to open the valve 120c connected with the servomotor 122. The throttle 123 which is controlled by the accelerator pedal 127 of the engine 101.

Figure 3:
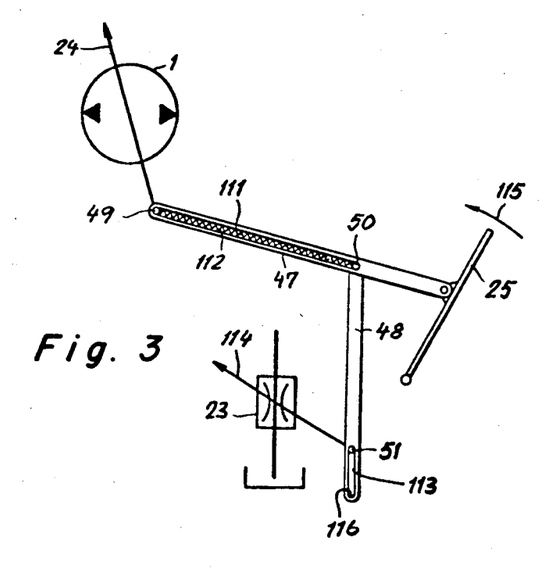
FIG. 3 shows another coupling in diagrammatic elevational view between the control member and the system for regulating the hydraulic motors.

In FIG. 3 I have shown an arrangement in which the pedal 25 is connected via a link 47, having a slot 111, with the control element 24 of the pump 1. In this embodiment, the control element 24 has a slide 49 received in the slot 111 and normally urged by a spring 112 against the left-hand end of this slot. This spring has a force which exceeds the normal displacement force for the element 24 until it reaches its extreme position.

A further link 48 is connected to link 47 and also has a slot 113 in which a slide 51 is received. The slide 51 is carried on the control element 114 of the throttle valve 23.

When the pedal 25 is displaced in a counterclockwise sense (arrow 115) therefore, the spring 112 will hold the slide 49 in its extreme position until the control element 24 of pump 1 has reached its extreme counterclockwise position. At this point, further displacement of pedal 25 will compress the spring 112 without further displacement of element 24. At this point, the bottom edge 116 of the slot 113 engages the slide 51 to enable the throttle 23 to be closed and increase the pressure ahead of it. This pressure is communicated to the hydromotor via line 21 as noted.

Figure 4:
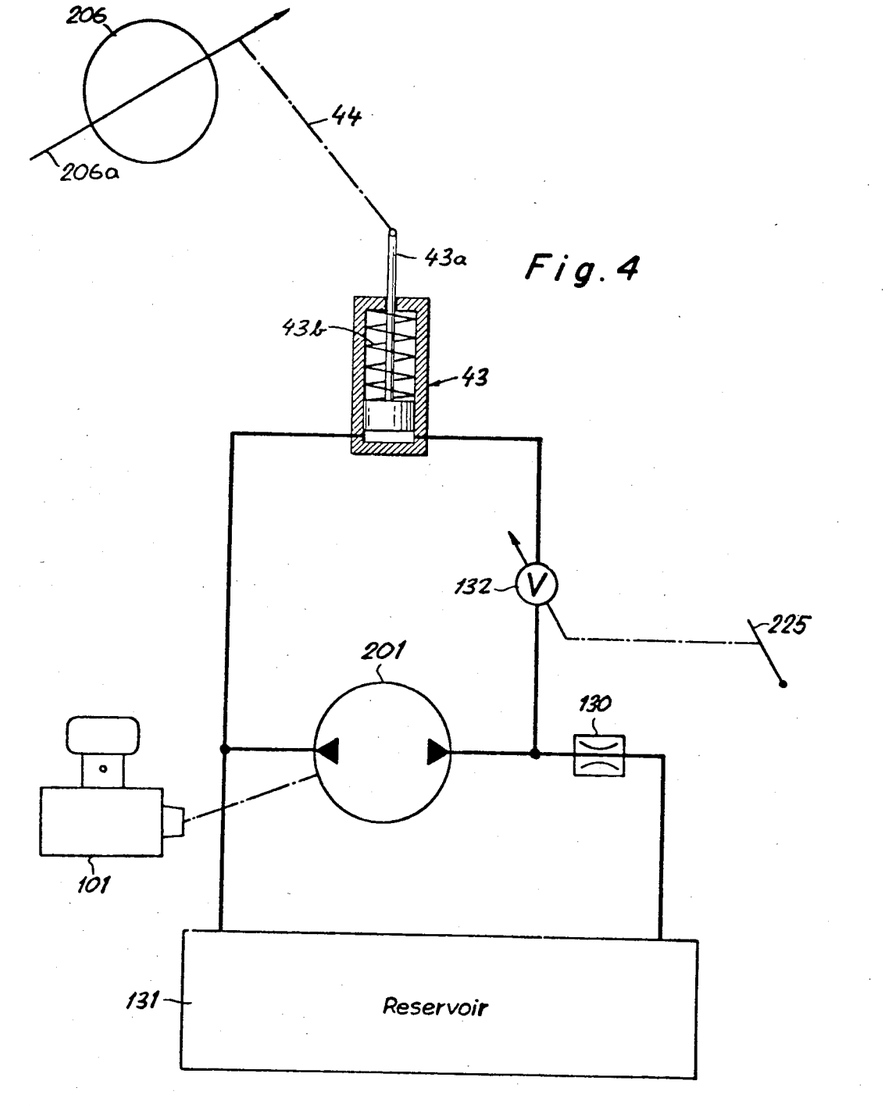
FIG. 4 is a diagram of still another arrangement embodying the present invention.

FIG. 4 shows that the engine 101 can drive the pump 201 (auxiliary pump) in addition to the transmission pump 1 which is not shown here. The auxiliary pump has a constant displacement per revolution and forces fluid to flow through a throttle 130 in a circulation path with a reservoir 131. When the pedal 225 controlling the position of the pump element of the main pump 1 is displaced after the pump element has reached its extreme operative position, e.g. via a lost-motion arrangement as shown in FIG. 3, it opens a valve 132 connecting a location behind the throttle 130 with a servomotor 43 whose piston 43a operates the control element 206a of the hydraulic motor 206 via a link 44. The spring force against which this hydraulic force operates is represented by a spring 43b which can, of course, be the resilient force of the hydraulic motor-control element resisting such displacement.

Figure 5:
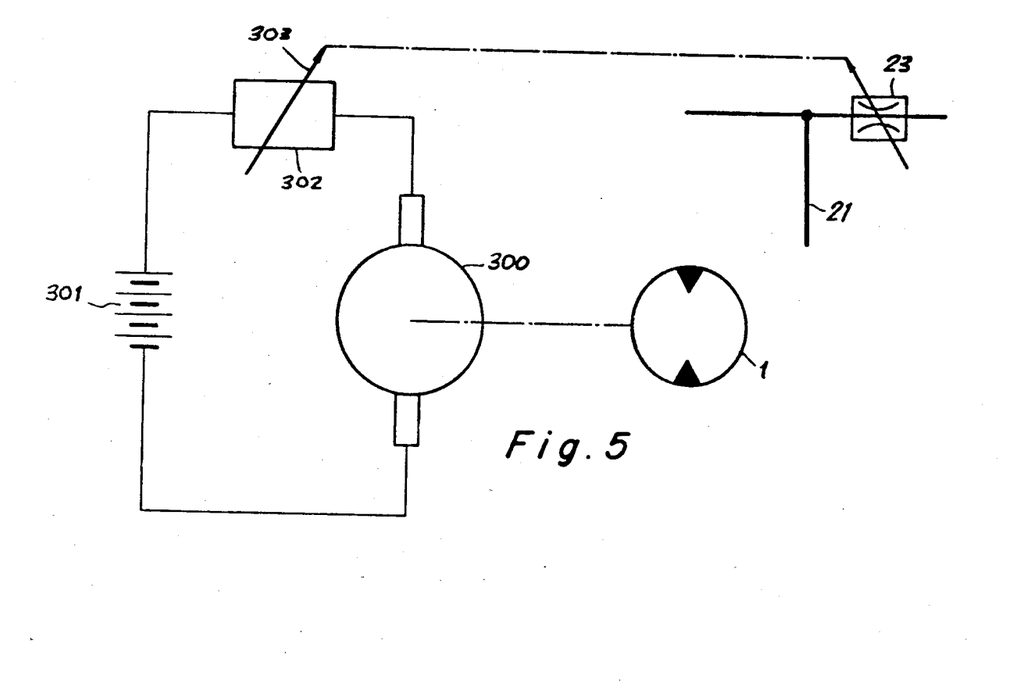
FIG. 5 shows a portion of the system of the invention as applied to an electrically powered vehicle.

FIG. 5 shows a system in which a shunt-wound motor 300 constitutes the prime mover and is connected to the storage battery 301 of the forklift truck by a controller 302 which reduces the field of the windings for increasing speed. In this case, the motor 300 is connected to the pump 1 and the control element 303 for the motor can be coupled with the throttle 23 energized by this pump as described in FIG. 1 and not shown in further detail in FIG. 5. The output for the hydraulic motors is tapped as in FIG. 1 from behind the throttle 23 via line 21.

Note that for a given hydraulic fluid flow rate (volume per unit time) for one of the hydraulic motors, the speed (RPM) of the motor increases when the stroke volume per revolution is decreased.

I claim:
1. A vehicle-drive system comprising:
an engine;
a wheel means for propelling a vehicle;
a hydrostatic transmission having a variable-displacement pump formed with an input shaft connected to said engine, a pump-control element for varying the displacement of said pump, and at least one variable-displacement motor hydraulically con- nected to said pump and formed with at least one output shaft connected to said wheel means, said transmission having a variable-speed ratio between said input shaft and said output shaft, and a motor-control element for controlling the displacement per revolution of said motor;

an operator-controlled actuating member; and control means directly and mechanically connecting said member with said pump-control element and hydraulically connecting said member with said motor-control element so that said actuating member, after initially exclusively moving said pump control element then effects hydraulic supply to said motor control element whereby said actuating member is effective at low to average speeds of said output shaft for establishing said ratio solely as a function of the position of said member by exclusively displacing the pump-control element and at higher speeds of said output shaft varying said ratio independently of the displacement of said pump-control element as a function of the rotary speed of said input shaft, the control means and tranmission being constructed and arranged so that said motor-control element is displaced when said pump-control element is in a position corresponding to maximum displacement per revolution of said pump whereby said pump-control element is displaced solely by operator control and said pump-control element and said motor-control element are effectively decoupled in said position of said pump-control element, means being provided whereby engine speed can affect said ratio by increasing hydraulic supply to said motor control element due to back pressure.

2. A vehicle-drive system comprising:

an engine;

a wheel means for propelling a vehicle;

a hydrostatic transmission having a variable-displacement pump formed with an input shaft connected to said engine, a pump-control element for varying the displacement of said pump, and at least one variable-displacement motor hydraulically connected to said pump and formed with at least one output shaft connected to said wheel means, said transmission having a variable-speed ratio between said input shaft and said output shaft, and a motor-control element for controlling the displacement per revolution of said motor;

an operator-controlled actuating member; and control means directly and mechanically connecting said member with said pump-control element and hydraulically connecting said member with said motor-control element so that said actuating member, after initially exclusively moving said pump control element then effects hydraulic supply to said motor control element whereby said actuating member is effective at low to average speeds of said output shaft for establishing said ratio solely as a function of the position of said member by exclusively displacing the pump-control element and at higher speeds of said output shaft varying said ratio independently of the displacement of said pump-control element as a function of the rotary speed of said input shaft, the control means and transmission being constructed and arranged so that said motor-control element is displaced when said pump-control element is in a position corresponding to maximum displacement per revolution of said pump whereby said pump-control element is displaced solely by operator control and said pump-control element and said motor-control element are effectively decoupled in said position of said pump-control element, means being provided whereby engine speed can affect said ratio by increasing hydraulic supply to said motor control element due to back pressure, said motor being formed with a hydraulic servomotor forming said motor-control element, the last mentioned means including an auxiliary pump driven by said prime mover, a hydraulic circuit including a throttle supplied by said auxiliary pump, and a conduit connecting said servomotor with said hydraulic circuit when said control element of said pump has been shifted into the maximum fluid displacement position of said pump for supplying a control fluid to said servomotor, said auxiliary pump having a constant displacement per revolution and said conduit connecting said servomotor with said hydraulic circuit upstream of said throttle.

* * * * *